(12) United States Patent
Rütsche

(10) Patent No.: US 6,542,444 B1
(45) Date of Patent: Apr. 1, 2003

(54) CARRIER CARD CAPABLE OF STORING INFORMATION DATA IN CD OR DVD FORMATS

(75) Inventor: Mario Rütsche, Berlingen (CH)

(73) Assignee: OMD Productions AG, Diessenhofen (CH)

( * ) Notice: Subject to any disclaimer, the term of this patent is extended or adjusted under 35 U.S.C. 154(b) by 0 days.

(21) Appl. No.: 09/537,103

(22) Filed: Mar. 29, 2000

(30) Foreign Application Priority Data

Mar. 29, 1999 (EP) ............................................. 99106359

(51) Int. Cl.⁷ .............................................. G11B 13/00
(52) U.S. Cl. ........................... 369/14; 235/454; 705/57; 380/201
(58) Field of Search .................. 369/14, 275.3, 369/273, 272, 292; 235/454, 493; 705/51, 57; 380/201, 261, 281

(56) References Cited

U.S. PATENT DOCUMENTS

| | | | |
|---|---|---|---|
| 3,839,601 | A | 10/1974 | Kimura et al. |
| 4,014,604 | A | 3/1977 | Schwartz |
| 4,114,181 | A | 9/1978 | Itoh |
| 4,500,777 | A | 2/1985 | Drexler |
| 4,542,288 | A | 9/1985 | Drexler |
| 4,544,835 | A | 10/1985 | Drexler |
| 4,592,042 | A | 5/1986 | Lemelson et al. |
| 4,622,661 | A | 11/1986 | Hoogeveen et al. |
| 4,680,456 | A | 7/1987 | Drexler |
| 4,680,458 | A | 7/1987 | Drexler |

(List continued on next page.)

FOREIGN PATENT DOCUMENTS

| | | |
|---|---|---|
| CH | 688996 | 7/1998 |
| DE | 9000256 | 9/1991 |
| DE | 4242247 | 6/1994 |
| DE | 29709648 | 1/1998 |
| EP | 0230069 | 7/1987 |
| EP | 0292720 | 11/1988 |
| EP | 0343982 | 11/1989 |
| EP | 0479340 | 4/1992 |
| EP | 0618711 | 10/1994 |
| FR | 2668277 | 4/1992 |
| JP | 56-3471 | 1/1981 |
| JP | 1-214486 | 8/1989 |
| JP | 4-40586 | 2/1992 |
| JP | 10138667 | 5/1998 |
| WO | 99/00765 | 1/1999 |
| WO | 99/62029 | 12/1999 |
| WO | 00/21080 | 4/2000 |

OTHER PUBLICATIONS

English Language Abstract of JP 01267858.
English Language Abstract of JP 10–138667.
English Language Abstract of JP 1–214486.

*Primary Examiner*—Tan Dinh
(74) *Attorney, Agent, or Firm*—Greenblum & Bernstein, P.L.C.

(57) ABSTRACT

A data carrier and a method of making the data carrier. The data carrier includes a plastic body, at least one metal layer arranged in or on the plastic body for carrying information encoded in one of CD and DVD format, a semiconductor chip arranged in the plastic body, a communication device for connecting the semiconductor chip with an external apparatus, and a mechanism for balancing an unbalance caused by the semiconductor chip. The method includes providing a matrix carrying the encoded information in a relief, the matrix including at least one projection, casting a first part of the plastic body against the matrix, forming the metal layer on a side of the first part of the plastic body disposed adjacent the matrix, forming at least one recess in the plastic body with the projection, and coating the metal layer with a second part of the plastic body, wherein the recess in the plastic body is capable of receiving the semiconductor chip.

35 Claims, 5 Drawing Sheets

U.S. PATENT DOCUMENTS

| | | |
|---|---|---|
| 4,680,460 A | 7/1987 | Drexler |
| 4,683,371 A | 7/1987 | Drexler |
| 4,745,268 A | 5/1988 | Drexler |
| 4,800,551 A | 1/1989 | Norris |
| 4,812,633 A | 3/1989 | Vogelgesang et al. |
| 4,868,373 A * | 9/1989 | Opheij et al. .................. 369/14 |
| 4,916,687 A | 4/1990 | Endo |
| 5,016,298 A | 5/1991 | Ris et al. |
| 5,045,676 A | 9/1991 | Kime |
| 5,059,774 A | 10/1991 | Kubo et al. |
| 5,107,099 A | 4/1992 | Smith |
| 5,108,789 A | 4/1992 | Michael et al. |
| 5,119,353 A * | 6/1992 | Asakura ...................... 369/13 |
| 5,235,586 A * | 8/1993 | Feamster et al. ............ 369/100 |
| 5,307,338 A | 4/1994 | Suzuki et al. |
| 5,608,717 A | 3/1997 | Ito et al. |
| 5,735,550 A | 4/1998 | Hinkle |
| 5,736,782 A | 4/1998 | Schairer |
| 5,982,736 A | 11/1999 | Pierson |
| 6,005,940 A * | 12/1999 | Kulinets ...................... 380/21 |
| 6,016,298 A | 1/2000 | Fischer |
| 6,044,046 A * | 3/2000 | Diezmann et al. ............ 369/14 |
| 6,137,767 A * | 10/2000 | Ro et al. ...................... 369/14 |
| 6,167,136 A * | 12/2000 | Chou ........................ 380/201 |
| 6,356,517 B1 * | 3/2002 | Liu et al. ...................... 369/14 |
| 6,359,842 B1 * | 3/2002 | Taguchi et al. ................ 369/14 |

\* cited by examiner

CARRIER CARD CAPABLE OF STORING INFORMATION DATA IN CD OR DVD FORMATS

CROSS-REFERENCE TO RELATED APPLICATIONS

The present application claims priority under 35 U.S.C. §119 of European Patent Application No. 991 06 359.5, filed on Mar. 29, 1999, the disclosure of which is expressly incorporated by reference herein in its entirety.

BACKGROUND OF THE INVENTION

1. Field of the Invention

The present invention relates to an information carrier as well as to a method for manufacturing and a use of such an information carrier.

2. Discussion of Background Information

Data media in the form of CDS or CD-ROMs or in DVD format are generally known. It has already been proposed that these types of data media be used as business cards, for example, by giving them a quadratic shape and designing them so that they can be centered in a reading device a CD or DVD reader.

Furthermore, it has been proposed to provide such devices with semiconductor chips for storing additional data as described in DE 42 42 247, the disclosure of which is expressly incorporated by reference in its entirety.

SUMMARY OF THE INVENTION

Accordingly, the invention provides a data carrier of the type mentioned above that can be read reliably. The data carrier includes a plastic body, at least one metal layer arranged in the plastic body carrying information encoded in CD or DVD format, a semiconductor chip arranged in the plastic body, a communication device for connecting the semiconductor chip with an external apparatus, and a balancing system or mechanism for balancing an unbalance caused by the semiconductor chip.

The balancing system or mechanism ensures that the data carrier is read with high rotational speed. Preferably, balancing is achieved by a counterweight which lies (in respect to the carrier's central opening) opposite to the semiconductor chip. Alternatively, the plastic body can be designed to be lighter on the side receiving the semiconductor chip, e.g. by setting back or trimming a corner of the card.

The invention also provides a data carrier of the type mentioned initially which can be easily connected to reading apparatus. In this aspect of the invention, the data carrier includes a plastic body, at least one metal layer arranged in the plastic body carrying information encoded in CD or DVD format, a semiconductor chip arranged in the plastic body, and an antenna for connecting the semiconductor chip with an external apparatus. By providing an antenna, the semiconductor chip can be easily connected to a suitable transceiver. Moreover, the antenna can, for example, be arranged on the surface of the plastic body. Alternatively, it can be formed by the metal layer.

According to another aspect of the invention, there is provided a data carrier including a plastic body, at least one metal layer arranged in the plastic body carrying information encoded in CD or DVD format, a semiconductor chip arranged in the plastic body, and contact pads connected to the semiconductor chip and arranged at an outside of the plastic body for connecting the semiconductor chip with an external apparatus, wherein the contact pads are formed by the metal layer.

In another aspect of the invention, the semiconductor chip of the data carrier does not affect production and/or capacity of the optical storage. In this aspect, the data carrier includes a plastic body, at least one metal layer arranged in the plastic body carrying information encoded in DVD format, a semiconductor chip arranged in the plastic body, a communication device for connecting the semiconductor chip with an external apparatus, wherein the data carrier includes two plastic layers, and wherein the metal layer carrying information encoded in DVD format is arranged in a first plastic layer and the semiconductor chip and the communication device are arranged in a second plastic layer.

By using the two layer geometry of a DVD and using the upper layer for the semiconductor chip, the lower layer can be used fully for optical storage. A typical thickness of the first plastic layer may be approximately 0.6 mm for compatibility with standard DVD readers. Preferably, the second plastic layer has a width of approximately 0.2 mm, such that both layers add up to the width of approximately 0.8 mm. Moreover, this corresponds to the standard ISO format for chip cards.

In yet another aspect of the invention, there is provided a data carrier exploiting the advantages of the combination of the semiconductor chip and the optical storage. In this aspect, the data carrier includes a plastic body, at least one metal layer arranged in the plastic body carrying information encoded in CD or DVD format, a semiconductor chip arranged in the plastic body comprising a counter for counting a number of accesses to the information, and a communication device for connecting the semiconductor chip with an external apparatus.

This provides the possibility of keeping track of the number of accesses to the optically stored data, e.g. for licensing and billing purposes. In particular, the counter can be used to disable access to the optically stored information after a certain number of accesses. This is particularly efficient when the data on the disk is encrypted and the chip holds the keys for encrypting it.

In yet another aspect of the invention, there is provided a data carrier that can be easily manufactured. In this aspect, the data carrier includes a plastic body, at least one metal layer arranged in the plastic body carrying information encoded in CD or DVD format, an opening in the plastic body for receiving a spindle of a disk drive, an annular insert arranged in the plastic body around the opening, a semiconductor chip arranged in the annular insert, and a communication device arranged in the plastic body for connecting the semiconductor chip with an external apparatus.

By placing the chip in an annular insert, it can be mounted easily. At the same time, since it is close to the spindle, its unbalancing effect is small. If an antenna is arranged in the annular insert, all electronic parts can be installed in one single step. Preferably, the inner diameter of the annular insert is larger than the inner diameter of the opening, i.e. the edge of the opening is formed by the plastic body. This simplifies centering and prevents the application of radial forces to the annular insert.

In another aspect, there is provided a method for producing data carriers of the type mentioned above in an efficient manner. In this aspect, the method for producing a data carrier having a plastic body, at least one metal layer arranged in the plastic body carrying information encoded in CD or DVD format, and a semiconductor chip arranged in the plastic body includes providing a matrix carrying the information encoded in a relief and having a projection, casting a first part of the plastic body against the matrix, coating a side of the first part of the plastic body shaped by the matrix with metal for forming the metal layer, and coating the metal layer with a second part of the plastic body, wherein a recess is formed in the plastic body by the projection and wherein the semiconductor chip is inserted into the recess.

This method allows for the preparation of the plastic body in substantially conventional manner and to position the semiconductor chip after the casting of the first part of the body.

The data carrier according to the present invention can e.g. be used as an identity card, credit card, business card or driver's license. It can also be used as a data carrier for film and video data or for computer programs. Of course, the invention is not limited to the card types just mentioned.

In particular, the data carrier can also be used for storing protected information. Based on the data stored in the semiconductor chip, it can be determined if the reader is authorized to access the data. For this purpose, the semiconductor chip can be provided with a decryption key or a credit counter.

According to the invention, a semiconductor component which can be connected with an external device, is arranged in the plastic body of the information carrier. This permits the information carrier to be designed as a "chip card," for example, which can be read in a card reader.

As discussed above it is preferred for the card to be provided with a compensating mechanism in order to equalize an imbalance created by the semiconductor component so that the card can also be read without difficulty at high speeds in CD or DVD reading devices. A counterweight opposite from the semiconductor component is particularly suitable as this type of compensating mechanism. But, it is also possible to design the plastic body to be asymmetrical so that it not as heavy on the side of the semiconductor component.

According to one aspect of the invention, there is provided a data carrier including a plastic body, at least one metal layer arranged in or on the plastic body for carrying information encoded in one of CD and DVD format, a semiconductor chip arranged in the plastic body, a communication device for connecting the semiconductor chip with an external apparatus, and a mechanism for balancing an unbalance caused by the semiconductor chip. The data carrier may further comprise an opening in the plastic body for receiving a spindle of a disk drive. The mechanism for balancing may comprise at least one counterweight arranged substantially opposite to the semiconductor chip. The at least one counterweight may be embedded in the plastic body. The plastic body may be essentially rectangular having four corners. The mechanism for balancing may comprise a corner section of the card disposed adjacent the chip having less mass than at least one of the other corners of the plastic body. The corner section may comprise a corner which has been rounded to a greater extent than at least one other corner of the plastic body. The mechanism for balancing may comprise an opening for receiving a spindle of a disk drive, the opening being offset in the direction of the chip from a center of the plastic body so as to balance the data carrier about an axis of the opening.

The invention is also directed to a data carrier including a plastic body, at least one metal layer arranged in or on the plastic body carrying information encoded in one of CD and DVD format, a semiconductor chip arranged in the plastic body, and an antenna for connecting the semiconductor chip with an external apparatus. The antenna may be arranged on a surface of the plastic body. The antenna may be formed on a surface of the plastic body by printing. The antenna may comprise a metal layer. The metal layer of the antenna and metal layer may be formed essentially simultaneously. The antenna may extend along a peripheral edge region of the plastic body.

The invention also provides for a data carrier including a plastic body, at least one metal layer arranged in or on the plastic body carrying information encoded in one of CD and DVD format, a semiconductor chip arranged in the plastic body, and contact pads connected to the semiconductor chip and arranged at an outside surface of the plastic body for connecting the semiconductor chip with an external apparatus, wherein the contact pads are formed essentially simultaneously with the metal layer. The metal layer may comprise a corrosion resistant metal. The corrosion resistant metal may comprise gold.

According to another aspect of the invention, there is provided a data carrier including a plastic body, at least one metal layer arranged in or on the plastic body carrying information encoded in one of DVD format and DVD5 format, a semiconductor chip arranged in the plastic body, and a communication device for connecting the semiconductor chip with an external apparatus, wherein the data carrier comprises at least first and second plastic layers, with the metal layer carrying information being arranged in or on the first plastic layer and the semiconductor chip and the communication device being arranged in or on the second plastic layer. The first plastic layer may comprise a thickness of approximately 0.6 mm. The second plastic layer may comprise a thickness of approximately 0.2 mm.

The invention also provides for a data carrier including a plastic body, at least one metal layer arranged in or on the plastic body carrying information encoded in one of CD and DVD format, a semiconductor chip arranged in the plastic body comprising a counter for counting a number of accesses to the information, and a communication device for connecting the semiconductor chip with an external apparatus. The information may be encrypted and the semiconductor chip stores keys for decrypting the information. The semiconductor chip may be capable of disabling access to the information after a certain number of accesses to the information.

Moreover, the invention provides for a data carrier including a plastic body, at least one metal layer arranged in or on the plastic body carrying information encoded in one of CD and DVD format, an opening in the plastic body for receiving a spindle of a disk drive, an annular insert arranged in or on the plastic body around the opening, a semiconductor chip arranged in the annular insert; and a communication device arranged in the insert for connecting the semiconductor chip with an external apparatus. The communication device may comprise an antenna arranged in the annular insert. The opening may comprise a first diameter and the annular insert comprises an opening having a second diameter, the first diameter being smaller than the second diameter. The communication device may be arranged in the annular insert.

According to another aspect of the invention, there is provided a method for producing a data carrier having a plastic body, at least one metal layer arranged in or on the plastic body carrying information encoded in one of CD or DVD format, and a semiconductor chip arranged in the plastic body, the method including providing a matrix carrying the encoded information in a relief, the matrix comprising at least one projection, casting a first part of the plastic body against the matrix, forming the metal layer on a side of the first part of the plastic body disposed adjacent the matrix, forming at least one recess in the plastic body with the projection, and coating the metal layer with a second part of the plastic body; wherein the recess in the plastic body is capable of receiving the semiconductor chip. The method may further comprise connecting the semiconductor chip to the metal layer. The method may also comprise forming at least one strip conductor in the metal layer and connecting the at least one strip conductor to the semiconductor chip. The recess may comprise an annular configuration. The method may further comprise disposing an annular insert comprising the semiconductor chip in the recess.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
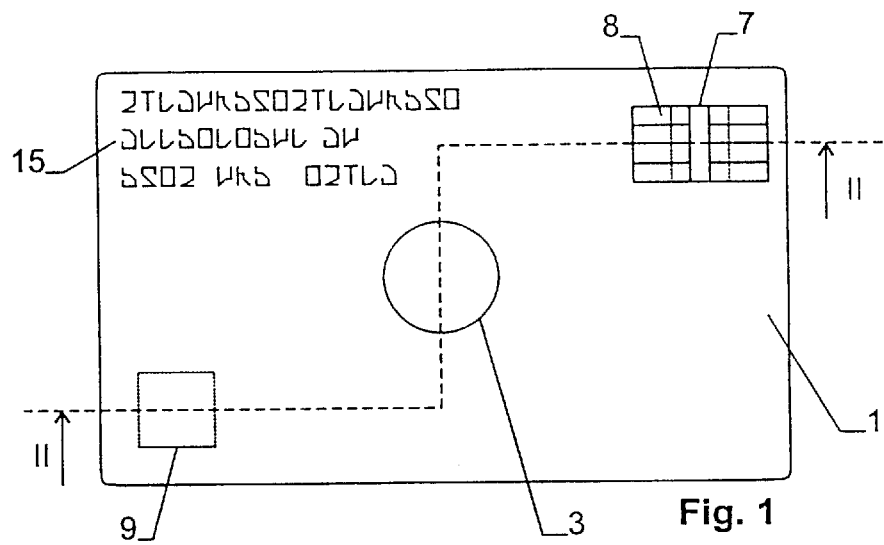
FIG. 1 is a top view of a first embodiment of the data carrier according to the invention.
Figure 2:
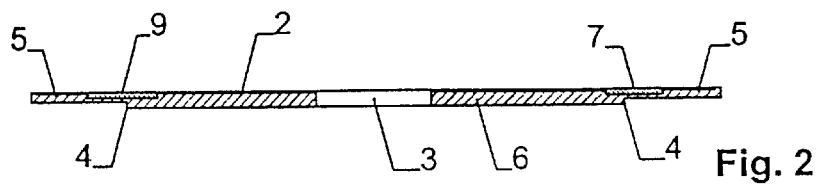
FIG. 2 is a section along line II—II of FIG. 1.
Figure 3:
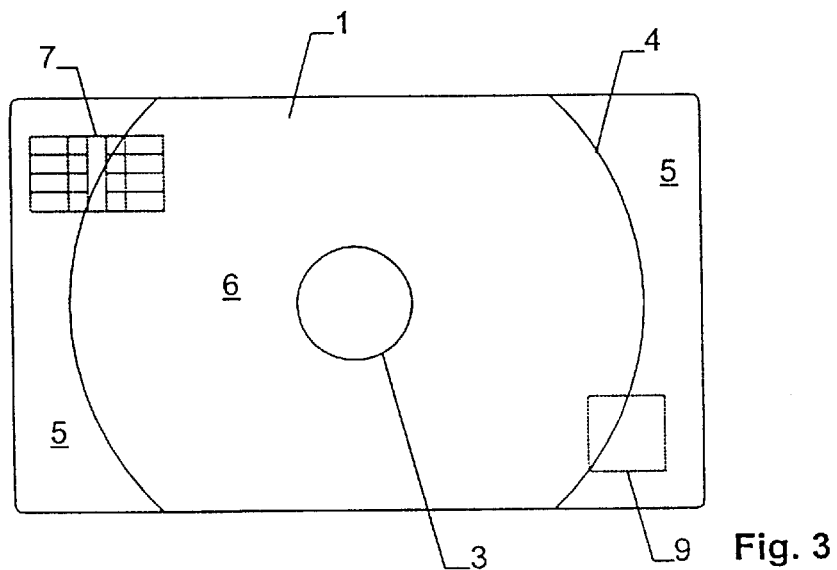
FIG. 3 is a view of the data carrier from below.

A preferred embodiment of the data carrier according to the present invention is shown in FIGS. 1–3. This embodiment includes a transparent plastic body 1, which is substantially rectangular in this embodiment. A metal layer 2 is arranged in plastic body 1, which carries information in the CD or DVD format. An opening 3 is provided at the center of plastic body 1 for receiving the spindle of a CD or DVD reader. A step 4 is arranged along a circle at the bottom side of the data carrier and separates a thinner, outer section 5 from a thicker inner section 6. The thickness of outer section 5 is preferably in the range of approximately 0.5 mm to approximately 0.7 mm, and most preferably 0.6 mm. Moreover, inner section 6 will normally be the conventional thickness of a CD (e.g., 1.2 mm±0.1 mm) or DVD. However, inner section 6 thickness may be in the range of approximately 0.8 mm to approximately 1.2 mm. The information on metal layer 2 is arranged in inner section 6. In inner section 6, the data carrier has the thickness of a conventional CD or DVD disk, such that metal layer 2 can be read in conventional manner from below. Step 4 allows the data carrier to be properly positioned in the tray of a CD or DVD reader. This step 4 is required in the present embodiment because the circumference of the data carrier does not correspond to the one of a conventional CD or DVD.

If the information is stored in CD format, the thickness of the inner section 6 is approximately 1.2 mm. If the information is stored in DVD format, the thickness of the inner section 6 is approximately 0.6 mm (if only one metal layer is provided) or approximately 1.2 mm (if two metal layers are provided).

Step 4 defines a circle whose diameter is approximately 80 mm, i.e. it corresponds to the outer diameter of a mini-CD and finds room in the mini-CD recess of a reader's tray. This difference in thickness between the inner section 6 and outer section 5 should be at least 0.3 mm and preferably between approximately 0.4 mm to approximately 0.5 mm. Additionally, the step may be integrally formed with the plastic body as it is cast, molded, or press molded. Alternatively, the step may be formed after the plastic body is cast by any number of conventional techniques such as machining. In still another embodiment, outer section 5 is separately formed, by any number of conventional techniques such as casting or press molding, from inner section 6. Thereafter inner section 6 and outer section 5 are attached using conventional attachment techniques such as ultrasonic bonding, adhesives, or other conventional attachment techniques.

A semiconductor chip 7, such as it is e.g. found in conventional chip cards, is arranged in a corner section of plastic body 1. Depending on the desired application, semiconductor chip 7 can be a passive, non-volatile memory or a microprocessor with its own control program. Semiconductor chip 7 is connected to contact pads 8 arranged on the surface of data carrier 1. They are used for connecting semiconductor chip 7 with an external apparatus, in particular an external reader. Preferably, the arrangement of the contact pads 8 and electrical properties of semiconductor chip 7 correspond to conventional standards such as they are used for chip cards.

Usually, the density of semiconductor chip 7 is higher than the density of plastic body 1, which leads to an asymmetric distribution of the mass in the data carrier. This might lead to unbalanced operation while rotating the data carrier about opening 3, in particular in high speed CD and DVD readers. Therefore, a counterweight 9 is arranged in a corner opposite to semiconductor chip 7. Counterweight 9 is also embedded in plastic body 1. The weight and volume of counterweight 9 is chosen such that the imbalance caused by semiconductor chip 7 upon rotation about opening 3 is compensated.

Figure 4:
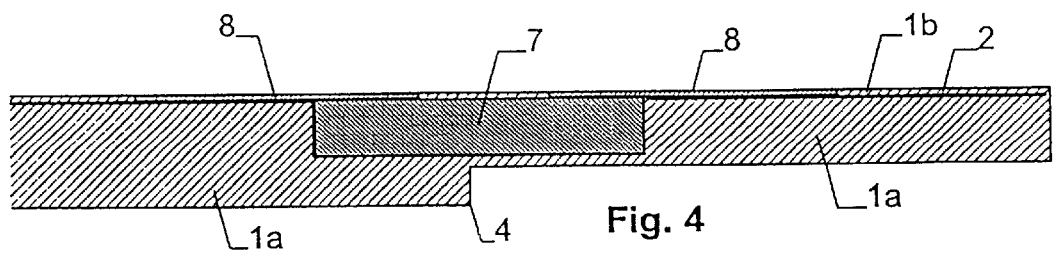
FIG. 4 is an enlarged part of FIG. 2.

FIG. 4 shows a detailed sectional view of the data carrier in the area of semiconductor chip 7. Plastic body 1 consists of a lower part 1*a* and an upper part 1*b* with metal layer 2 arranged between them. Semiconductor chip 7 lies in a recess in lower part 1*a* and its surface is approximately at the height of metal layer 2. Metal layer 2 may or may not extend into the area of semiconductor chip 7. The contacts 8 are touching semiconductor chip 7 from above.

Figure 5:
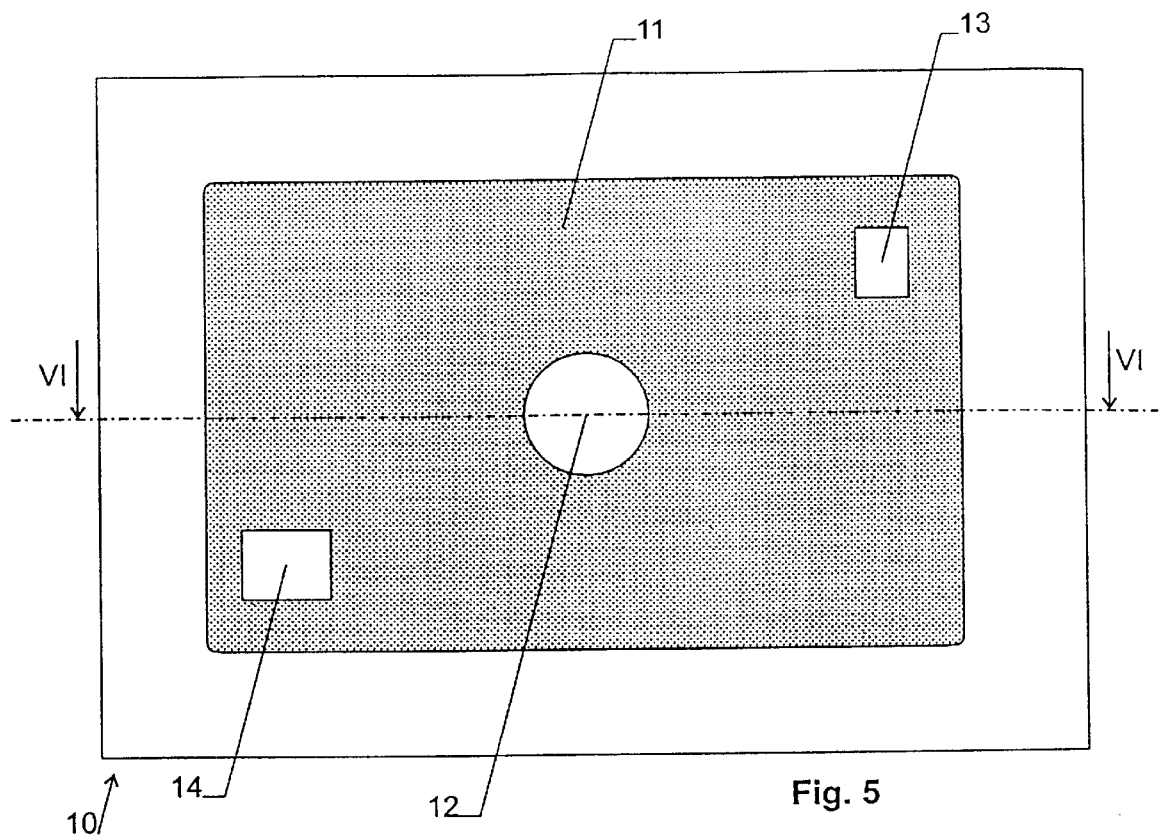
FIG. 5 is a matrix, i.e. part of a casting mold, for producing the data carrier.
Figure 6:
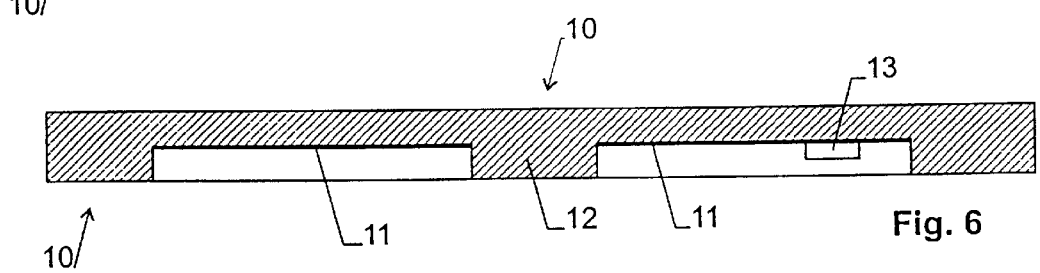
FIG. 6 is a section along line VI—VI of the matrix or mold of FIG. 5.

In manufacturing the data carrier of FIGS. 1–4, a matrix 10 is prepared first, as shown in FIGS. 5 and 6. Matrix 10 includes a surface 11 carrying a relief corresponding to the negative relief to be formed in metal layer 2. Furthermore, matrix 10 includes a central projection 12 for creating opening 3. It further includes two smaller projections 13, 14 at the positions of semiconductor chip 7 and counterweight 9.

During production of the data carrier, matrix 10 is pressed against a suited counter mold and the room between both molds is filled with plastic material, preferably a polycarbonate, which is hardened to form lower part 1*a* of plastic body 1. The projections 13, 14 form recesses in lower part 1*a* for receiving and positioning semiconductor chip 7 and counterweight 9.

After hardening first part 1*a* of plastic body 1, it is removed from the mold and coated with metal layer 2, preferably aluminum or gold, on its top surface, e.g. by sputtering or other conventional coating techniques. Then, semiconductor chip 7 and counterweight 9 are inserted into the recesses of lower part 1*a* of plastic body 1, whereby they are automatically positioned correctly. Then the contacts 8 are connected to semiconductor chip 7. Then, upper part 1*b* is formed by depositing a hardening lacquer. Thereafter, the surface of the data carrier can be provided with a suitable printing 15 (FIG. 1).

Figure 13:
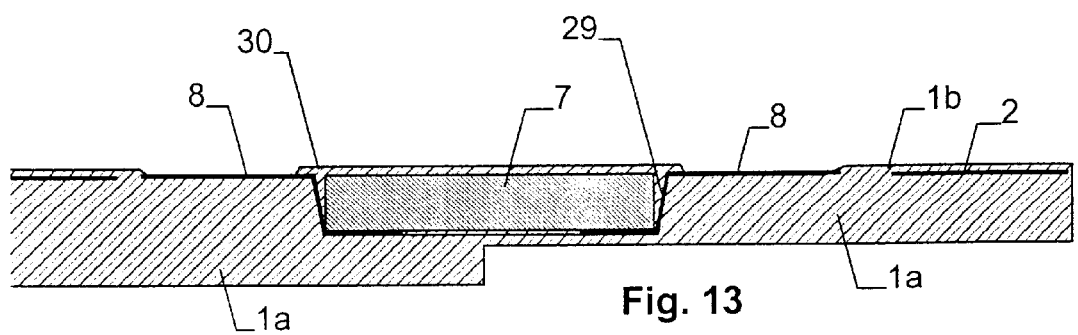
FIG. 13 is an alternative to the embodiment of FIG. 4.

FIG. 13 shows an alternative embodiment of a semiconductor chip 7 with contacts 8, which can be produced in very simple manner using the method described above. Here, the contacts 8 are formed by structures arranged in metal layer 2. For this purpose, a suitable mask is laid over lower part 1*a* of plastic body 1 during deposition of metal layer 2, such that metal layer 2 forms different, mutually isolated strips that extend to the bottom of recess 29. Then, semiconductor chip 7 is inserted into recess 29 with its contacts facing down to contact the strips of metal layer 2. Semiconductor chip 7 is then covered by a lacquer layer 30.

If the embodiment of FIG. 13 is used, metal layer 2 is preferably made from a corrosion resistant material, in particular gold.

Generally, strip conductors of any required shape can be formed in metal layer 2 and connected to semiconductor chip 7, such as power supply strips, antenna strips or strips connecting semiconductor chip 7 to contact pads.

In the embodiments described so far, contacts 8 were provided for connecting semiconductor chip 7 with an external reader. Alternatively, or in addition to this, an antenna can be provided, as it is e.g. shown in FIG. 7.

Figure 7:
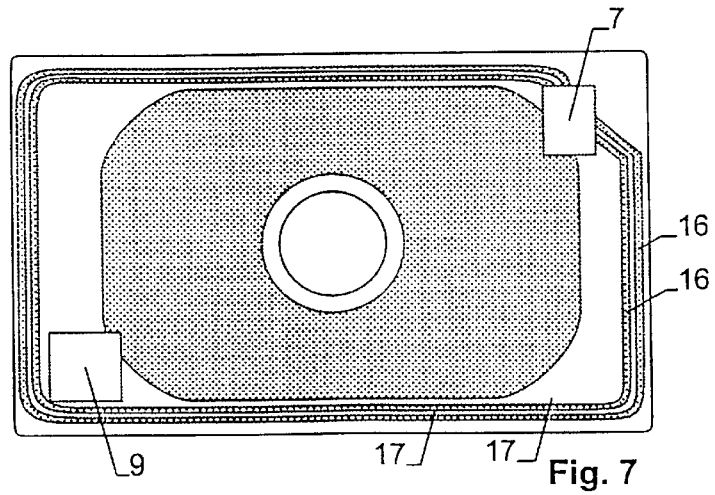
FIG. 7 is a second embodiment of the data carrier with an antenna.

In the embodiment of FIG. 7, where metal layer 2 is shown as a gray shaded area, the antenna consists of two strips 16 formed in metal layer 2. In contrast to conventional CDS or DVDs, metal layer 2 is therefore not one single, continuous layer extending over the whole disk, but is divided into mutually isolated regions to form the strips 16 separated by isolating areas 17. Strips 16 preferably run along the edge of plastic body 1 for enclosing as large an area as possible and for minimizing the reduction of the readable area in CD or DVD format. The strips 16 end at semiconductor chip 7 and are electrically connected to the same, e.g. in the manner shown in FIG. 13.

Semiconductor chip 7 can also be connected wirelessly with an external apparatus by utilizing antenna 16. The external apparatus can e.g. be a device for ticket control or for testing an access authorization.

Moreover, antenna 16 can be used in conventional manner for data transfer, and also for supplying electric energy to semiconductor chip 7.

In the embodiment of FIG. 7, antenna 16 is formed in metal layer 2. However, it is also possible to arrange antenna 16 at the surface of the data carrier, e.g. by applying conducting strips, in particular using a printing method, e.g. screen printing an electrically conducting paint or other conventional techniques.

Figure 14:
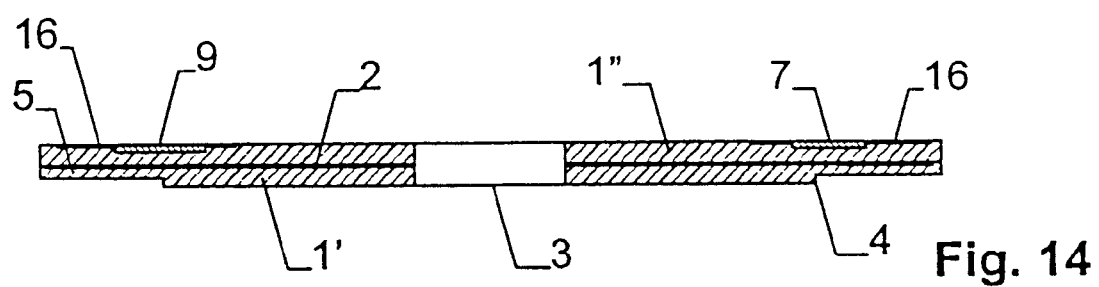
FIG. 14 is an embodiment of the invention for a data carrier in DVD5-format.

FIG. 14 shows how semiconductor chip 7 and, if desired, an antenna 16 can be arranged in data carriers in DVD5 format. In such data carriers, plastic body 1 consists of two plastic layers 1', 1", wherein only lower plastic layer 1' is provided with a metal layer 2 with readable information. Upper plastic layer 1" is required for increasing the thickness of the data carrier. In a preferred embodiment, semiconductor chip 7, and, if provided, antenna 16, are arranged in upper plastic layer 1". Upper plastic layer 1" provides more room for the electronic components, and the storage capacity of the data carrier is accordingly not impaired.

In conventional DVDs, lower and upper plastic layers 1', 1" both have a thickness of 0.6 mm. In a preferred embodiment of the present invention, however, upper plastic layer 1" has a thickness of only approximately 0.2 mm so that the total thickness of the carrier is approximately 0.8 mm, corresponding to the thickness of chip cards according to ISO standard.

Figure 8:
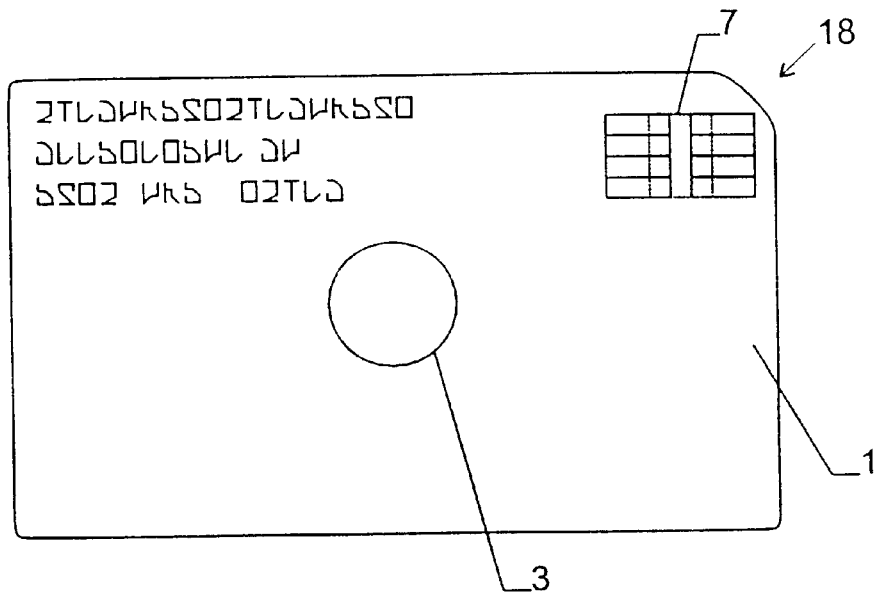
FIG. 8 is a third embodiment of the data carrier.

Antenna strips 16 of FIG. 7 can be prepared by adding a suitable mask for covering the isolating areas 17 when depositing metal layer 2. Alternatively, the isolating areas can be etched off after depositing metal layer 2. Of course, other strip forming techniques may also be utilized In the embodiments of FIGS. 1 and 5, a counterweight 9 is provided for compensating an imbalance caused by semiconductor chip 7 (and contact pads 8). FIG. 8 shows an embodiment where this compensation is achieved by an asymmetric design of plastic body 1. Plastic body 1 is still essentially rectangular having four corners, but one corner 18 close to semiconductor chip 7 is more rounded and therefore set back. With this design, it is possible to eliminate the need for a counterweight 9.

In another embodiment opening 3 can be slightly offset from the center of plastic body 1 towards semiconductor chip 7*a* for achieving the same effect. With this design, it is possible to eliminate the need for a counterweight 9.

Figure 9:
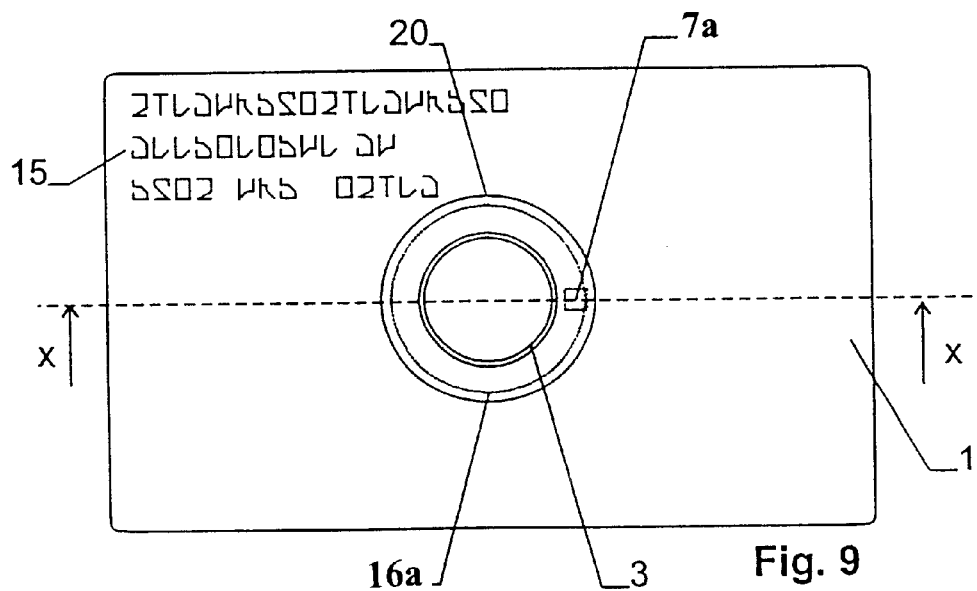
FIG. 9 is a fourth embodiment of the data carrier.
Figure 10:
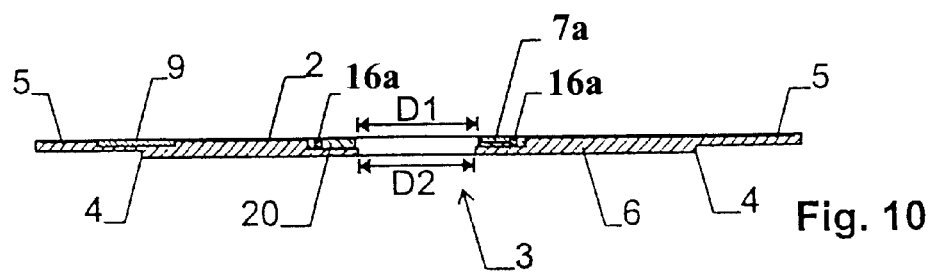
FIG. 10 is a section along line X—X of FIG. 9.

FIGS. 9 and 10 show a further embodiment of the data carrier. Here, a recess is formed in the top surface of plastic body 1, and an annular insert 20 is placed therein. Insert 20 is preferably manufactured separately and includes semiconductor chip 7*a* and an annular antenna 16*a*.

The inner diameter D1 of insert 20 is designed to be slightly larger than D2 of opening 3, such that the position of the data carrier on the drive's spindle is defined by plastic body 1 instead of annular insert 20. This reduces the requirements regarding positional precision and size tolerance of annular insert 20.

The embodiment of FIG. 9 is designed to be relatively easy to manufacture because insert 20 can be prepared separately and thereafter be inserted into plastic body 1. For preparing the recess for the annular insert, a suitable projection is provided in matrix 10, in a similar manner to those described in FIG. 6.

Due to the arrangement of the semiconductor chip 7a close to the axis of rotation of the data carrier, the embodiment of FIG. 9 requires no counterweight.

It should be noted that the embodiments of the data carrier shown here have the approximate size of a business or credit card. Depending on application, other sizes and shapes can be used. In particular, the data carrier can also have regular CD or DVD size.

As mentioned above, the data carrier can e.g. be used as a driver's license, a credit card, an identity card or a business card, but it can also be used in conventional manner as storage for films or video data, etc. Company information, time tables, user manuals, application programs, music, films, etc. can be stored on metal layer 2 in DVD or CD format. Semiconductor chip 7, 7a can e.g. be used for checking the card at gates, teller machines, etc, or for determining an authorization for accessing the stored data.

Semiconductor chip 7, 7a can also control the reading of the data in metal layer 2. In a preferred embodiment, at least part of the data on metal layer 2 is stored in encrypted form. A key and/or a program for decryption is stored on semiconductor chip 7.

Figure 11:
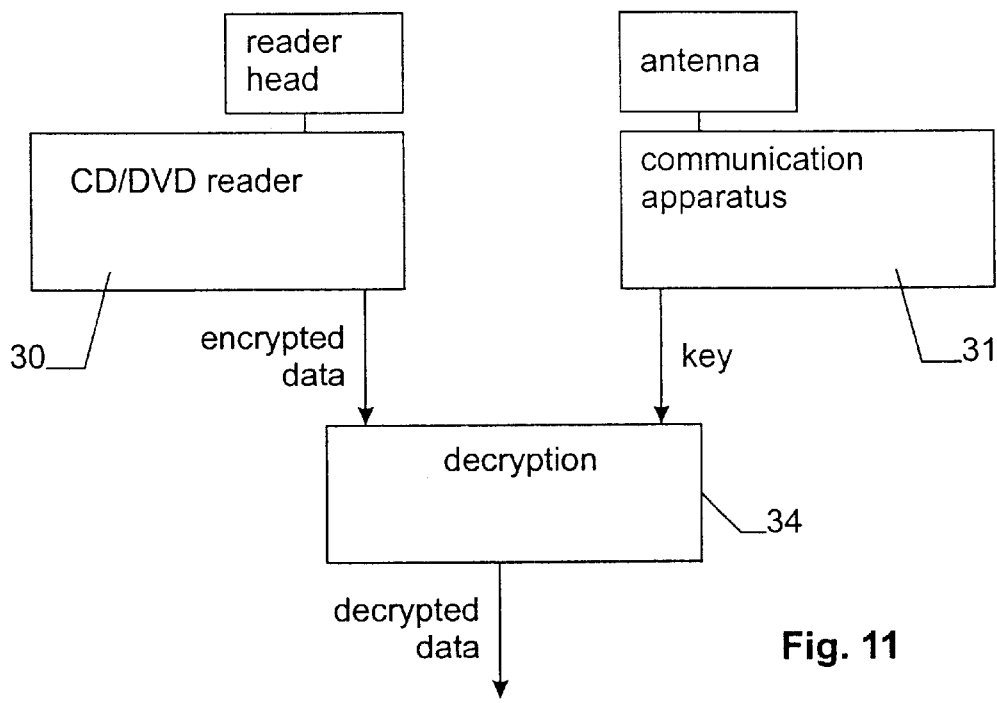
FIG. 11 is a reader for encrypted data.
Figure 12:
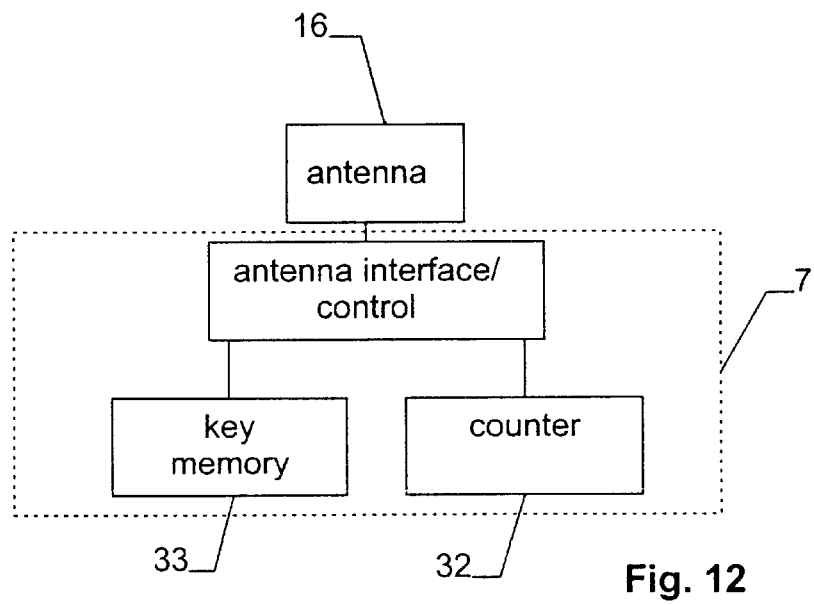
FIG. 12 is a possible embodiment of the semiconductor chip when being used as data key.

FIG. 11 shows a possible design of a device for reading data carriers with encrypted information. It comprises a reader 30 for CDS, or DVDs. Further, it comprises a communication apparatus 31 for communicating with semiconductor chip 7, 7a, preferably in wireless manner with an antenna 16 as it is shown in FIGS. 7, 9 or 10. A block diagram of a corresponding semiconductor chip 7, 7a is shown in FIG. 12.

At the beginning of a read operation, a read signal is sent to semiconductor chip 7, 7a utilizing communication apparatus 31. Semiconductor chip 7, 7a first tests a counter 32. If the value of counter 32 is not zero, it is decremented by one and a key stored in a key memory 33 is returned. If the value of counter 32 is zero, the key is not returned.

The key is transmitted from communication apparatus 31 to a decryption unit 34. At the same time, CD/DVD reader 30 starts reading the data in metal layer 2. At least part of the data stored therein is encrypted, and it is decrypted by decryption unit 34 using the key provided by semiconductor chip 7, 7a.

Counter 32 can be reloaded, i.e. be set to a value larger than zero, by utilizing a dedicated apparatus.

The system of FIGS. 11 and 12 is especially suited for data carriers where the contents can only be read for a fee. The fee is paid at a point of sale, which sets counter 32 to a number corresponding to the permitted number of read operations. Then, for each reading of the data on metal layer 2, counter 32 is decremented until the permitted number of read operations is reached. Such a system can e.g., be used for rental of video or audio data.

In other words, semiconductor chip 7, 7a can be designed for disabling access to the stored information after a certain number of accesses to the information.

Encryption in the context of the present invention designates measures that make accessing the data (or part thereof) stored in metal layer 2 difficult, such as e.g., a binary encryption of the data or a scrambling of the data, etc.

It is also possible to provide semiconductor chip 7, 7a with a counter 32 only. In this case, the reading apparatus is designed such that it only reads the protected data on the metal layer when the counter is not zero, decrementing the counter during each read operation. Preferably, the protected data on metal layer 2 are encrypted such that reading in conventional devices is impossible. The key for decrypting the data is either stored in the reading apparatus or on metal layer 2.

Semiconductor chip 7 can also be used as an anti copying device because conventional writing apparatus for DVDs and CDS can only copy the data on metal layer 2 but not the data stored in semiconductor chip 7.

Generally, in this embodiment, protected information is stored on metal layer 2. Before reading, semiconductor chip 7 is read for detecting if the reader is authorized for reading the data.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A data carrier comprising:
   a plastic body;
   at least one metal layer arranged in or on the plastic body carrying information encoded in one of CD and DVD format;
   a semiconductor chip arranged in the plastic body; and
   an antenna for connecting the semiconductor chip with an external apparatus,
   wherein the antenna extends along a peripheral edge region of the plastic body.

2. The data carrier of claim 1 wherein the antenna is arranged on a surface of the plastic body.

3. The data carrier of claim 2, wherein the antenna is formed on a surface of the plastic body by printing.

4. The data carrier of claim 1, wherein the antenna comprises a metal layer.

5. The data carrier of claim 4, wherein the metal layer of the antenna and the at least one metal layer are formed essentially simultaneously.

6. A data carrier comprising:
   a plastic body;
   at least one metal layer arranged in or on the plastic body carrying information encoded in one of DVD format and DVD5 format;
   a semiconductor chip arranged in the plastic body; and
   a communication device for connecting the semiconductor chip with an external apparatus,
   wherein the data carrier comprises at least first and second plastic layers, with the metal layer carrying information being arranged in or on the first plastic layer and the semiconductor chip and the communication device being arranged in or on the second plastic layer, and wherein the second plastic layer is arranged above the first plastic layer.

7. The data carrier of claim 6, wherein the first plastic layer comprises a thickness of approximately 0.6 mm.

8. The data carrier of claim 7, wherein the second plastic layer comprises a thickness of approximately 0.2 mm.

9. The data carrier of claim 6, wherein the second plastic layer comprises a thickness of approximately 0.2 mm.

10. A data carrier comprising:

a plastic body;

at least one metal layer arranged in or on the plastic body carrying information encoded in one of CD and DVD format;

a semiconductor chip arranged in the plastic body comprising a counter for counting a number of accesses to the information; and a communication device for connecting the semiconductor chip with an external apparatus.

11. The data carrier of claim 10, wherein the information is encrypted and the semiconductor chip stores keys for decrypting the information.

12. The data carrier of claim 10, wherein the semiconductor chip is capable of disabling access to the information after a certain number of accesses to the information.

13. A data carrier comprising:

a data carrier body including an upper surface, a lower surface, a first layer and a second layer;

the first layer having an upper surface which lies on the same plane as the upper surface of the data carrier body;

the second layer having a lower surface which lies on the same plane as the lower surface of the data carrier body;

at least one metal layer arranged in or on the second layer and carrying encoded information;

a semiconductor chip arranged in or on the first layer;

a communication device for connecting the semiconductor chip with an external apparatus; and the communication device being arranged in or on the first layer.

14. The data carrier of claim 13, wherein the at least one metal layer carries information encoded in one of CD format, DVD format and DVD5 format.

15. The data carrier of claim 13, wherein the second layer comprises a circular edge and wherein the first layer comprises a rectangular edge.

16. The data carrier of claim 13, wherein the second layer and the first layer are connected to each other.

17. The data carrier of claim 13, wherein the at least one metal layer is arranged between the first and second layers.

18. The data carrier of claim 13, further comprising an opening in the data carrier body for receiving a spindle of a disk drive.

19. The data carrier of claim 13, further comprising a mechanism for balancing an unbalance caused by the semiconductor chip.

20. The data carrier of claim 19, wherein the mechanism for balancing comprises at least one counterweight arranged substantially opposite to the semiconductor chip.

21. The data carrier of claim 20, wherein the at least one counterweight is embedded.

22. The data carrier of claim 19, wherein the mechanism for balancing comprises a corner section of the data carrier body disposed adjacent the semiconductor chip having less mass than at least one of the other corners of the data carrier body.

23. The data carrier of claim 22, wherein the corner section comprises a corner which has been rounded to a greater extent than at least one other corner of the data carrier body.

24. The data carrier of claim 19, wherein the mechanism for balancing comprises an opening for receiving a spindle of a disk drive, the opening being offset in the direction of the semiconductor chip from a center of the data carrier body so as to balance the data carrier body about an axis of the opening.

25. The data carrier of claim 13, wherein the data carrier body is essentially rectangular.

26. The data carrier of claim 13, wherein the first layer comprises a thickness of approximately 0.6 mm.

27. The data carrier of claim 26, wherein the second layer comprises a thickness of approximately 0.2 mm.

28. The data carrier of claim 13, wherein the first layer comprises a thickness of approximately 0.2 mm and the second layer comprises a thickness of approximately 0.6 mm.

29. The data carrier of claim 13, wherein the communication device comprises an antenna.

30. The data carrier of claim 29, wherein the antenna extends along a peripheral edge region of the plastic body.

31. The data carrier of claim 13, wherein the first layer is a plastic layer and the second layer is a plastic layer.

32. The data carrier of claim 13, wherein the first layer comprises a hardening lacquer and the second layer comprises a plastic.

33. The data carrier of claim 32, wherein the plastic of second layer comprises a polycarbonate.

34. A data carrier comprising:

a plastic body including an upper surface, a lower surface, a first upper part and a second lower part;

the first upper part having an upper surface which lies on the same plane as the upper surface of the plastic body;

the second lower part having a lower surface which lies on the same plane as the lower surface of the plastic body;

at least one metal layer arranged between the first upper and the second lower parts of the plastic body and carrying encoded information;

a semiconductor chip having an upper surface that is arranged closer to the upper surface of the plastic body and than the lower surface of the plastic body;

a communication device for connecting the semiconductor chip with an external apparatus; and the communication device being arranged closer to the upper surface of the plastic body and than the lower surface of the plastic body.

35. The data carrier of claim 34, wherein the communication device is arranged between the upper surface of the second lower part and the upper surface of the plastic body.

* * * * *